(12) United States Patent
Rothschild

(10) Patent No.: US 12,500,422 B2
(45) Date of Patent: Dec. 16, 2025

(54) SMART ENERGY RECYCLING SYSTEM AND METHOD THEREOF

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

(21) Appl. No.: 18/631,729

(22) Filed: Apr. 10, 2024

(65) Prior Publication Data

US 2025/0323509 A1 Oct. 16, 2025

(51) Int. Cl.
*H02J 3/38* (2006.01)
*H02J 3/28* (2006.01)
*H02J 13/00* (2006.01)

(52) U.S. Cl.
CPC ............ *H02J 3/38* (2013.01); *H02J 3/28* (2013.01); *H02J 13/00002* (2020.01); *H02J 13/00004* (2020.01); *H02J 13/00028* (2020.01); *H02J 2300/24* (2020.01)

(58) Field of Classification Search
CPC .......... H02J 3/38; H02J 3/28; H02J 13/00002; H02J 13/00004; H02J 13/00028; H02J 2300/24
See application file for complete search history.

(56) References Cited

U.S. PATENT DOCUMENTS

| 9,432,587 | B1 * | 8/2016 | Twede | G02F 2/00 |
|---|---|---|---|---|
| 9,685,818 | B2 * | 6/2017 | Martin | H01L 31/053 |
| 9,800,050 | B2 * | 10/2017 | Clifton | G05F 1/66 |
| 10,114,165 | B1 * | 10/2018 | Heinrich | G02B 6/0066 |
| 10,591,656 | B1 * | 3/2020 | Schubert | A01G 33/00 |
| 10,842,000 | B2 * | 11/2020 | Brebenel | H05B 45/50 |
| 11,262,039 | B1 * | 3/2022 | Green | F21V 17/12 |
| 11,277,095 | B2 * | 3/2022 | Ackermann | H10K 50/125 |
| 11,489,483 | B2 | 11/2022 | Janowski | |
| 2005/0284147 | A1 * | 12/2005 | Allen | H01L 31/035281 |
| | | | | 257/E31.038 |
| 2007/0191075 | A1 * | 8/2007 | Greene | H02J 50/001 |
| | | | | 455/299 |
| 2008/0149169 | A1 * | 6/2008 | Flaherty | H01L 31/048 |
| | | | | 136/251 |

(Continued)

*Primary Examiner* — Daniel Kessie
*Assistant Examiner* — Brian K Baxter
(74) *Attorney, Agent, or Firm* — Dobbin IP Law, P.C.; Geoffrey E. Dobbin

(57) ABSTRACT

A smart energy recycling system and methods are disclosed. The smart energy recycling system comprises an energy device comprising emitting substrates configured to emit light of a pre-defined wavelength after receiving power from power grid. A photochromatic material disposed around emitting substrates. In an embodiment, photochromatic material is configured to convert photons emitted by emitting substrates into electrical energy. In an embodiment, the photochromatic materials corresponds to PV solar cells. An integrated energy storage device is electrically connected to an energy device and configured to store electrical energy produced by photochromatic materials. A regulation circuit of integrated energy storage device is configured to regulate and direct voltage and current generated by photochromatic materials and provide electrical energy to electrical grid or loads. In an embodiment, electrical energy being stored in an integrated energy storage device.

20 Claims, 7 Drawing Sheets

(56) References Cited

U.S. PATENT DOCUMENTS

| | | | |
|---|---|---|---|
| 2009/0206759 A1* | 8/2009 | Wang | H05B 47/115 250/201.1 |
| 2010/0200041 A1* | 8/2010 | Dearborn | B60L 8/003 136/244 |
| 2010/0206359 A1* | 8/2010 | Evans | B64B 1/14 136/247 |
| 2011/0168236 A1* | 7/2011 | Chan | H01L 31/055 257/E31.119 |
| 2011/0284053 A1* | 11/2011 | Brewer | H01L 25/167 136/246 |
| 2012/0118359 A1* | 5/2012 | Battistutti | H02S 20/26 136/251 |
| 2013/0050860 A1* | 2/2013 | Giebink | G02B 19/0042 359/853 |
| 2013/0073098 A1* | 3/2013 | Gan | H02J 3/32 700/286 |
| 2015/0131274 A1* | 5/2015 | Liu | A01G 7/045 362/183 |
| 2018/0308601 A1* | 10/2018 | Diggins | H01L 31/035281 |
| 2019/0006547 A1* | 1/2019 | Watts | B32B 17/10302 |
| 2020/0326678 A1* | 10/2020 | Guzman | G10L 15/26 |
| 2021/0316627 A1* | 10/2021 | Di Foglio | B60L 53/11 |
| 2021/0376612 A1* | 12/2021 | Barooah | G05B 13/048 |
| 2021/0399152 A1* | 12/2021 | Meinardi | H01L 31/0488 |
| 2022/0069767 A1* | 3/2022 | Graner | H02S 40/42 |
| 2022/0085615 A1* | 3/2022 | Moehlen | H02J 3/381 |
| 2022/0115981 A1 | 4/2022 | Krarti | |
| 2022/0278244 A1* | 9/2022 | Stathatos | H01L 31/048 |
| 2022/0337244 A1* | 10/2022 | Nugent | H03K 17/162 |
| 2023/0010090 A1* | 1/2023 | Stuckenberg | E03B 3/28 |
| 2023/0033629 A1* | 2/2023 | Lunt, III | H01L 31/055 |
| 2023/0140222 A1* | 5/2023 | Van Straten | H01L 31/0488 296/97.1 |
| 2023/0275171 A1* | 8/2023 | Chen | H01L 31/0488 438/64 |
| 2023/0353086 A1* | 11/2023 | Somayajula | H01M 10/465 |
| 2023/0395739 A1* | 12/2023 | Gila | H01L 31/042 |
| 2024/0030717 A1* | 1/2024 | Guschlbauer | H02J 3/381 |

\* cited by examiner

SMART ENERGY RECYCLING SYSTEM AND METHOD THEREOF

TECHNICAL FIELD

The presently disclosed invention is related in general to renewable energy conversion to electrical energy using photovoltaics. More specifically, the invention relates to a method and a smart energy recapturing system that captures and converts ambient light from artificial sources into reusable electricity.

BACKGROUND

Traditional solar panels harness sunlight to generate electricity. While effective, they primarily operate in the visible light spectrum and may not efficiently capture other light wavelengths. Thermoelectric Generators convert temperature differences into electricity, which can be used in conjunction with light-based systems to improve overall efficiency. Conventional energy storage solutions include lithium-ion batteries, lead-acid batteries, and super capacitors. These stores harvested energy for later use but may have limitations in terms of capacity, lifespan, or efficiency. Charge controllers are used to regulate the flow of energy from the recycling device to the storage unit, ensuring optimal charging and preventing overcharging. Some energy recycling solutions offer modular designs, allowing users to add or remove units based on requirements. However, ensuring seamless integration and optimal performance across multiple units can be challenging.

Certain materials can convert non-visible light wavelengths into visible light, which can then be captured using conventional solar cells. However, this introduces additional conversion steps, potentially leading to efficiency losses. Building-integrated Photovoltaics (BIPV) are solar panels designed to replace conventional building materials, such as roofs or facades. While they offer aesthetic integration, balancing transparency, efficiency, and durability remains a challenge. Thin-film Solar Cells are flexible and lightweight, offering more design versatility compared to rigid solar panels. However, achieving high efficiency and durability in thin-film variants can be more challenging.

While these conventional technologies have made significant strides in addressing the outlined technical problems, they often come with trade-offs in terms of efficiency, scalability, aesthetics, or integration. There is a growing need for sustainable and efficient energy sources in the face of escalating energy demands and environmental concerns. As traditional solar panels became more commonplace, they face one particular drawback: they are not aesthetically pleasing. This deficiency, combined with the desire to integrate solar technology seamlessly into everyday structures, such as windows and facades, led to the development of transparent solar panels. Transparent solar panels are made with a new type of solar cell that is able to absorb light without being darkened by it.

The advent of transparent solar panels leads to the possibility of harvesting ambient light from artificial sources in a manner to, essentially, recycle the energy emitted from those sources. It is readily understood that there is no way to capture 100% of the energy emitted from a light source as entropy will continually reduce the availability of usable energy. However, by harvesting a portion of this otherwise wasted energy there can be a commensurate drop in the net energy needed to power a given system, such as a building, and, once properly scaled, make significant decreases in the net carbon footprint of a given system.

CN108333813B discloses the electronic window uses advanced technology to dynamically adjust its transparency based on external sunlight, allowing more natural light in while generating power through integrated solar cells. The present disclosure focuses on efficiently capturing, converting, storing, and regulating electrical energy. It incorporates emitting substrates and photochromatic materials to capture light, converting it into electricity. With an integrated energy storage device and a regulation circuit, this system ensures a reliable and continuous power supply, offering an innovative solution for sustainable energy utilization and storage.

CN115315817A discloses TLSCs are transparent luminescent solar concentrators that capture sunlight efficiently through luminescence, especially on transparent surfaces. Presently disclosed invention produces electricity by converting light into electrical energy using emitting substrates and photochromatic materials. Additionally, the system regulates the distribution of the harvested electricity.

U.S. Pat. No. 11,489,483B2 discloses Smart windows prioritize architectural integration, emphasizing transparency control and energy generation through solar-collecting coatings. The present disclosure concentrates on converting light into electricity using emitting substrates and photochromatic materials for standalone energy generation and storage.

US20220115981A1 discloses an energy conservation in buildings through the implementation of movable shading devices. It focuses on regulating and controlling shading, optimizing energy usage within the building. The present disclosure revolves around an energy recycling mechanism that utilizes emitting substrates and photochromatic materials. This system is designed for efficient conversion and storage of electrical energy. Additionally, it places a strong emphasis on regulated distribution, directing the harvested energy to the grid or specific loads in a controlled manner.

TWM616460U discloses building integration by introducing a multifunctional window system with interchangeable panels, aiming to enhance adaptability in various situations. The present disclosure focuses on using emitting substrates and photochromatic materials to convert light into electrical energy and regulate its distribution.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The forgoing summary is illustrative only and is not intended to be in any way limiting. In addition to the illustrative aspects, embodiments, and features described above, further aspects, embodiments, and features will become apparent by reference to the drawings and the following detailed description.

The smart energy recycling system and methods are disclosed. The smart energy recycling system (100) utilizes an energy device comprising at least one emitting substrate configured to emit light of a pre-defined wavelength range after receiving power from a power grid, and plurality of photochromatic materials (212) disposed around the at least one emitting substrate. In an embodiment, the plurality of photochromatic material is configured to convert some of the photons emitted by the at least one emitting substrate into electrical energy. In an embodiment, the plurality of photochromatic materials (212) corresponds to PV solar cells. An integrated energy storage device (104) may be electrically connected to the energy device and configured to store the electrical energy produced by the plurality of photochromatic materials (212). A regulation circuit (214) of the integrated energy storage device (104) may be configured to regulate and direct a voltage and a current generated by the plurality of photochromatic materials (212) and provide the electrical energy to at least one of an electrical grid or one or more loads (218). In an embodiment, the electrical energy being stored in the integrated energy storage device.

In an embodiment, the at least one emitting substrate may be selected from the set of substrates consisting of at least one of LED's, filaments of diverse types, and lasers. In an embodiment, a communication unit (106) configured to transmit information related to a power output of the smart energy recycling system (100) and a storage capacity of the integrated energy storage device (104) to an external device (108). In an embodiment, the external device (108) corresponds to at least one of a cloud server (108a), an application installed on an electronic device (108b) of a user. The electronic device may be one of a laptop computer, desktop computer, mobile phone, mobile tablet, or other communication device. In an embodiment, the user regulates and controls at least one of the power outputs of the smart energy recycling system, the storage capacity of the integrated energy storage device, and a timing of usage of the generated electrical energy from the electronic device (108b) based on the transmitted information.

In an embodiment, the communication unit (106) utilizes wired and wireless technologies to transmit information. In an embodiment, the wireless technologies comprise at least one of Bluetooth, ZigBee, Wi-Fi, satellite communications or Near field communication (NFC), wherein the wired technologies comprise at least one of LAN, WAN, or MAN. In an embodiment, a plurality of the energy devices electrically connected to each other in series either wireless manner or in a wired manner. In an embodiment, a combined power output of the plurality of the energy devices is stored in the integrated energy storage device (104) or provided to at least one of an electrical grid or one or more loads (218).

In an embodiment, the smart energy recycling system is configured to receive a request for energy recycling from a user via an electronic device (108b). In an embodiment, the request comprises utilizing at least one of a stored electrical energy in the integrated energy storage device (104) or generate the electrical energy from the energy device utilizing the harvested energy for powering one or more loads (218) based on the received request. In an embodiment, the plurality of photochromatic materials (212) being either opaque, semi-transparent or transparent.

The smart energy recycling system and methods are disclosed. The method comprises emitting light, by a plurality of emitting substrates of an energy device, of a pre-defined wavelength after receiving power from a power grid. The method comprises converting, by the plurality of emitting substrates of an energy device, photons emitted by the plurality of emitting substrates into an electrical energy. In an embodiment, the substrates may correspond to LED's, LCDs, and the like that are configured to emit light.

In an embodiment, the plurality of photochromatic materials (212) corresponds to PV solar cells. In an embodiment, a plurality of photochromatic materials (212) are disposed around the plurality of emitting substrates. The method further comprises storing the electrical energy produced by the plurality of photochromatic materials (212) into an integrated energy storage device. In an embodiment, the energy device (is electrically connected to the integrated energy storage device. The method further comprises regulating and directing, by a regulation circuit (214) of the integrated energy storage device, a voltage and a current generated by the plurality of photochromatic materials (212). The method further comprises providing the electrical energy to at least one of an electrical grid or one or more loads (218). In an embodiment, the system captures electrical energy stored within an integrated energy storage device, facilitating its utilization for various purposes such as powering devices, acting as a backup power source, and enabling potential contribution to a power grid (216).

In an embodiment, the method further comprises absorbing, by a transparent luminescent solar concentrator (TLSC), a specific invisible ultra violet (UV) and an infrared light wavelength. In an embodiment, the TLSC comprises one or more organic salts configured to enable absorption and the absorbed wavelengths cause the organic salts to luminesce. The method further comprises emitting, by the TLSC, light in invisible wavelength. In an embodiment, the light in the invisible wavelength is within an infrared range. The method further comprises guiding, by the TLSC, the emitted light in invisible wavelength to one or more edges of one or more structures. In an embodiment, the one or more structures corresponds to at least one of a window or a panel or a lighting device such as a light bulb (220). The method further comprises converting, by the TLSC, the guided emitted light to electrical energy using one or more thin photovoltaic (PV) solar cell strips positioned at the one or more edges thereby performing energy recycling.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
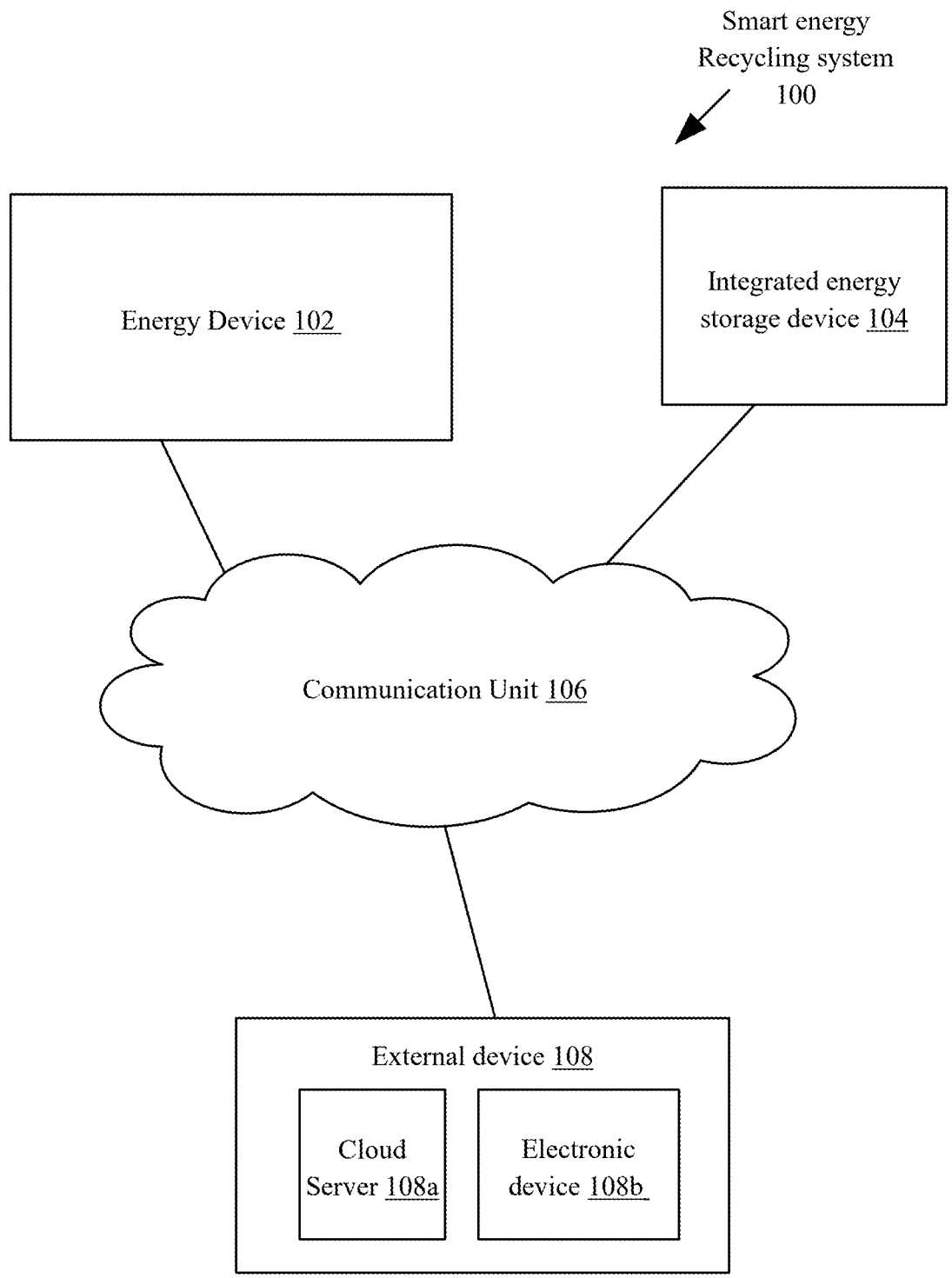
FIG. 1 is a block diagram that illustrates a system environment in which various embodiments of the method and the system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The primary objective of the invention is to develop a system that efficiently captures and converts ambient light into electrical energy through innovative photovoltaic technologies and integration with energy storage components. Another objective of the invention is to provide a reliable and scalable energy storage solution that efficiently stores the harvested electrical energy, ensuring continuous availability, adaptability, and seamless integration with energy management systems. Another objective of the invention is to implement intelligent control, monitoring, and regulation mechanisms that optimize energy utilization, distribution, and storage, maximizing system efficiency, reliability, and adaptability to varying energy demands or environmental conditions. Another objective of the invention is to provide a lighting system and device that recaptures energy for storage and utilization with the power grid, therefore providing an energy efficient solution beneficial to the environment.

Another objective of the invention is to facilitate user-friendly interfaces, interactive controls, and personalized experiences that empower users to monitor, control, and customize energy management parameters, fostering transparency, engagement, and user satisfaction within the Smart Energy Recycling System ecosystem. Another objective of the invention is to enable seamless integration, communication, and collaboration between diverse system components, external devices, cloud-based platforms, or third-party applications, fostering a cohesive, interconnected energy management ecosystem that leverages data-driven insights, collaborative functionalities, and integrated control capabilities.

Another objective of the invention is to prioritize data security, system integrity, and user privacy through robust authentication mechanisms, encryption protocols, and cybersecurity measures, ensuring secure, reliable, and trustworthy operation within the interconnected Smart Energy Recycling System environment. Another objective of the invention is to design a modular, scalable, and adaptable system architecture that accommodates evolving energy management requirements, technological advancements, or system expansion needs, ensuring long-term viability, flexibility, and investment protection within dynamic operational landscapes. Another objective of the invention is to promote energy efficiency, resource optimization, and environmentally conscious practices through eco-friendly designs, energy-saving features, and sustainable energy management strategies, aligning with global sustainability goals and fostering responsible energy consumption behaviors.

In summary, the objectives of the present disclosure encompass the development of a sophisticated, user-centric Smart Energy Recycling System in various embodiments that leverages innovative technologies, intelligent control mechanisms, and seamless integration capabilities to optimize energy recycling and conservation, storage, distribution, and management practices. By addressing modern energy management challenges, user preferences, and sustainability considerations, the invention aims to redefine energy management paradigms, foster innovation, and promote responsible, efficient, and sustainable energy utilization across diverse applications and operational scenarios.

FIG. 1 is a block diagram that illustrates a system environment 100 in which various embodiments of the method and the energy device 102 may be implemented. The smart energy recycling system environment 100 typically includes an energy device 102, an integrated energy storage device 104, a communication unit 106, and an external device 108. In an embodiment, the external device 108 comprises one or more a cloud server 108a and one or more electronic device 108b are typically communicatively coupled with each other via the communication unit 106. In an embodiment, the energy device 102 may communicate with the integrated energy storage device 104, and the external device 108 using cloud server 108a and electronic device 108b.

The energy device 102 may refer to emitting substrates that emit light upon receiving power, interacting with surrounding photochromatic materials. This configuration enables the device to harness ambient light, converting photon energy into electrical energy through the photovoltaic effect. By utilizing specialized photochromatic materials, the energy device 102 achieves efficient energy conversion rates, optimizing the absorption, and utilization of emitted photons to generate a stable electrical output suitable for storage or direct utilization. The energy device 102 is electrically connected to an integrated energy storage device 104, facilitating seamless energy transfer, storage, and retrieval processes. This integration ensures continuous energy availability, buffering fluctuating energy inputs, and enabling adaptive energy management strategies. Incorporating a regulation circuit, the energy device 102 regulates the generated electrical energy's voltage and current levels, ensuring compatibility with connected electrical grids, loads (218), or external devices. This regulated output facilitates reliable energy distribution, minimizes system inefficiencies, and enhances overall energy utilization efficiency. Equipped with intelligent control mechanisms, the energy device 102 adapts its operational parameters in response to varying environmental conditions, user-defined preferences, or system requirements. This adaptive management capability optimizes energy recycling, storage, and distribution processes, maximizing system performance and user satisfaction. The energy device 102 incorporates protective features, robust design elements, and quality-assured components, ensuring safe, reliable operation under diverse operational scenarios, environmental conditions, or external disturbances. This focus on safety and reliability enhances system longevity, minimizes maintenance requirements, and fosters user trust and confidence in the device's performance. Designed for scalability and adaptability, the energy device's 102 modular architecture, and flexible design parameters support seamless integration with additional energy devices, diverse system configurations, or evolving technological advancements. This scalability facilitates system expansion, customization, and futureproofing, ensuring long-term viability and investment protection.

The integrated energy storage device 104 efficiently stores the electrical energy generated by the energy device, providing a reliable buffer that ensures continuous energy availability, even during periods of fluctuating ambient light levels or variable energy demands. Incorporating advanced battery technologies, capacitive elements, controllers, or innovative storage mediums, the device achieves high energy storage efficiency, minimizing energy losses during the charging and discharging processes, and optimizing overall system performance. Equipped with intelligent energy management algorithms or control mechanisms, the integrated storage device adapts its charging and discharging profiles in response to real-time energy demand patterns, system requirements, or user-defined preferences, maximizing energy utilization and extending system autonomy. The integrated energy storage device 104 incorporates regulatory circuitry or control mechanisms that manage the stored electrical energy's voltage and current levels, ensuring compatibility with downstream electrical systems, enhancing energy distribution efficiency, and facilitating seamless integration within the Smart Energy Recycling System. Designed with safety as a paramount consideration, the integrated energy storage device incorporates protective features such as overcharge protection, over-discharge protection, thermal management systems, or fault detection mechanisms, ensuring safe, reliable operation and mitigating risks associated with electrical faults or operational anomalies. The integrated energy storage device's modular architecture supports scalability, facilitating the integration of additional storage modules or capacity expansions to accommodate evolving energy demands, system configurations, or technological advancements. This modular design enhances system flexibility, adaptability, and future-proofing capabilities, ensuring long-term viability and scalability. Emphasizing environmental responsibility, the integrated energy storage device may utilize eco-friendly materials, energy-efficient manufacturing processes, or recyclable components, minimizing environmental impact, reducing carbon footprint, and promoting sustainable energy storage practices within the Smart Energy Recycling System.

The communication unit 106 enables seamless transmission and reception of data, performance metrics, energy parameters, and system status updates between the Smart Energy Recycling System and external devices, user interfaces, or cloud-based platforms. This data exchange capability supports real-time monitoring, analysis, and adaptive control functionalities. Designed for versatility and compatibility, the communication unit 106 supports both wireless and wired connectivity options, accommodating diverse communication protocols, standards, or network architectures. This flexibility ensures interoperability with a wide range of devices, networks, or infrastructures, fostering seamless integration and connectivity within the Smart Energy Recycling System ecosystem. The communication unit 106 incorporates support for various communication protocols, such as Bluetooth, ZigBec, Wi-Fi, NFC, LAN, WAN, or MAN, facilitating comprehensive integration with external devices, networks, or communication infrastructures. This protocol compatibility ensures efficient data exchange, optimized performance, and enhanced system functionality across interconnected platforms. The communication unit 106 may feature user-friendly interfaces, graphical displays, or interactive controls that enable users to monitor system performance, configure operational settings, receive notifications, or interact with the Smart Energy Recycling System remotely. This user-centric design promotes transparency, control, and user engagement, enhancing the overall user experience and system usability. Prioritizing data security and privacy, the communication unit 106 implements robust encryption algorithms, authentication mechanisms, or secure communication protocols that safeguard sensitive information, protect against unauthorized access, and mitigate risks associated with cyber threats or data breaches. This focus on security ensures data integrity, confidentiality, and system reliability within the Smart Energy Recycling System environment. Engineered for scalability and adaptability, the communication unit 106 supports modular expansions, firmware updates, or software enhancements that accommodate evolving communication requirements, technological advancements, or system integration needs. This scalability facilitates futureproofing, system customization, and long-term viability within dynamic operational landscapes. The communication unit 106 interfaces seamlessly with control systems, management platforms, or external applications, supporting coordinated system operation, synchronized data exchange, and integrated control functionalities. This collaborative integration enhances system responsiveness, adaptability, and operational efficiency, fostering a cohesive, interconnected Smart Energy Recycling System ecosystem.

The external device 108 engages in data exchange, synchronization, and collaboration with the Smart Energy Recycling System, facilitating the transmission of energy metrics, performance data, system status updates, or user commands between the two entities. This data-driven interaction supports real-time monitoring, analysis, and adaptive energy management strategies. Equipped with monitoring interfaces, control functionalities, or user interfaces, the external device 108 enables users, operators, or systems administrators to remotely monitor the Smart Energy Recycling System's performance, configure operational parameters, receive notifications, or execute control commands. This remote accessibility enhances operational visibility, control, and user engagement within the Smart Energy Recycling System ecosystem. The external device 108 ensures seamless integration, compatibility, and interoperability with the Smart Energy Recycling System, accommodating diverse communication protocols, data formats, or system architectures. This compatibility fosters cohesive system integration, streamlined data exchange, and synergistic collaboration across interconnected platforms or environments. Leveraging data analytics tools, machine learning algorithms, ai and/or predictive modeling capabilities, the external device 108 analyzes data received from the Smart Energy Recycling System, generating actionable insights, performance trends, or predictive forecasts. This analytical capability enables informed decision-making, proactive maintenance strategies, or optimization initiatives tailored to specific operational objectives or energy management goals.

Prioritizing data security, privacy, and system integrity, the external device 108 implements robust authentication mechanisms, encryption protocols, or cybersecurity measures that safeguard sensitive information, protect against unauthorized access, and mitigate risks associated with cyber threats or malicious activities. This security focus ensures data confidentiality, system reliability, and user trust within the Smart Energy Recycling System environment. Designed with a user-centric approach, the external device 108 offers intuitive interfaces, graphical displays, or interactive controls that enhance user interaction, operational transparency, and system usability. This user-centric design fosters a positive user experience, promotes user engagement, and facilitates effective collaboration within the Smart Energy Recycling System ecosystem. The external device 108 supports scalability, adaptability, and future-proofing capabilities, accommodating evolving energy management requirements, technological advancements, or system expansion needs. This scalability ensures long-term viability, system flexibility, and investment protection within dynamic operational landscapes or changing energy management paradigms.

The cloud server 108a provides scalable, secure, and reliable data storage solutions for storing energy metrics, performance data, system configurations, or historical records generated by the Smart Energy Recycling System. This centralized data repository facilitates efficient data management, accessibility, and archival, ensuring data integrity, availability, and long-term retention. Leveraging advanced computing capabilities, the cloud server processes, analyzes, and interprets data received from the Smart Energy Recycling System, generating actionable insights, performance trends, or predictive forecasts. This analytical processing supports informed decision-making, optimization strategies, or proactive maintenance initiatives tailored to specific energy management objectives or operational requirements. The cloud server enables remote monitoring, control, and management of the Smart Energy Recycling System through web-based interfaces, application programming interfaces (APIs), or integrated management platforms. This remote accessibility fosters operational visibility, real-time oversight, and adaptive control functionalities, empowering users, operators, or systems administrators to monitor, configure, or manage the Smart Energy Recycling System remotely. Designed for scalability, flexibility, and adaptability, the cloud server accommodates evolving data storage needs, computational requirements, or system integration complexities associated with the Smart Energy Recycling System. This scalability ensures seamless expansion, resource optimization, and performance scalability within dynamic operational environments or changing energy management paradigms. Prioritizing data security, privacy, and regulatory compliance, the cloud server implements robust security protocols, encryption algorithms, access controls, or compliance measures that safeguard sensitive information, protect against unauthorized access, and ensure adherence to applicable data protection regulations or industry standards. This security focus fosters data confidentiality, system integrity, and user trust within the Smart Energy Recycling System environment. The cloud server supports seamless integration, compatibility, and interoperability with the Smart Energy Recycling System, external devices, communication interfaces, or third-party applications through standardized protocols, APIs, or data exchange formats. This integration capability fosters cohesive system interoperability, streamlined data exchange, and collaborative functionalities across interconnected platforms or ecosystems. Leveraging high-performance computing resources, redundant infrastructure, or fault-tolerant architectures, the cloud server ensures optimal performance, reliability, and availability of services, applications, or data access functionalities associated with the Smart Energy Recycling System. This performance and energy conservation optimization enhances system responsiveness, resilience, and user satisfaction within the Smart Energy Recycling System ecosystem.

The electronic device (108b) offers a user-friendly interface, graphical displays, or interactive controls that enable users to monitor the Smart Energy Recycling System's performance, configure operational settings, receive notifications, or execute control commands. This interactive interface promotes user engagement, operational transparency, and personalized control within the Smart Energy Recycling System ecosystem. Equipped with connectivity features, application interfaces, or web-based platforms, the electronic device (108b) facilitates remote monitoring, control, and management of the Smart Energy Recycling System. Users, operators, or systems administrators can remotely access, monitor, or adjust system parameters, enhancing operational visibility, real-time oversight, and adaptive control functionalities. Leveraging data visualization tools, analytical applications, or integrated dashboards, the electronic device (108b) visualizes energy metrics, performance data, or system status updates received from the Smart Energy Recycling System. This data-driven visualization enables users to interpret, analyze, and derive insights from complex data sets, supporting informed decision-making, performance optimization, or energy management strategies. The electronic device (108b) facilitates seamless communication, collaboration, and data exchange with the Smart Energy Recycling System, external devices, or cloud-based platforms through standardized protocols, wireless technologies, or integrated communication interfaces. This connectivity promotes collaborative functionalities, coordinated system operation, and integrated energy management practices across interconnected devices or environments. Prioritizing user privacy, data security, and device integrity, the electronic device (108b) implements robust security features, authentication mechanisms, encryption protocols, or privacy controls that safeguard sensitive information, protect against unauthorized access, and ensure secure communication with the Smart Energy Recycling System. This security focus fosters user trust, data confidentiality, and system reliability within the interconnected ecosystem. The electronic device (108b) supports integration with specialized applications, software platforms, or third-party services tailored to energy management, sustainability, or smart home automation functionalities. Users can customize, extend, or enhance the device's capabilities through application ecosystems, plugins, or software updates, fostering personalized user experiences and tailored energy management solutions. Emphasizing energy efficiency, resource optimization, or sustainability principles, the electronic device (108b) may incorporate energy-saving features, eco-friendly designs, or adaptive power management strategies that minimize energy consumption, extend battery life, or promote environmentally conscious usage behaviors. This focus on sustainability aligns with the Smart Energy Recycling System's objectives, promoting energy-conscious behaviors, conservation of energy, and sustainable energy management practices.

The electronic device 102 may comprise of one or more processors and one or more memories. The one or more memories may include computer readable code that may be executable by the one or more processors to perform predetermined operations. In an embodiment, the electronic device 102 may present a user-interface to the user for regulating and controlling the power output of the Smart Energy Recycling System. Examples of the electronic device 102 may include, but are not limited to, a personal computer, a laptop, a personal digital assistant (PDA), a mobile device which may include a tablet, smart phone, or smart watch such as an Apple Watch®, or any other computing device.

The present disclosure seeks to advance beyond these limitations by introducing an integrated, efficient, and user-friendly energy recycling system and method. The present disclosure draws from the challenges posed by conventional solar panels, which can be visually obtrusive and limit design flexibility, particularly in architectural applications. Researchers recognized the potential of harnessing sunlight beyond the visible spectrum to maintain transparency while capturing non-visible light for energy conversion. This realization gave rise to the concept of transparent luminescent solar concentrators (TLSCs) using organic salts.

The TLSC technology, as the backbone of the invention, selectively absorbs ultraviolet and infrared light, invisible to the naked eye. Through luminescence, the absorbed energy is transformed into another invisible wavelength, allowing visible light to pass through the panel. This emitted light is then directed to the edges, where thin photovoltaic solar cells convert it into electricity.

The present disclosure of a future where buildings seamlessly incorporate energy-generating windows and lighting devices, contributing to a sustainable and aesthetically pleasing urban landscape. The scalable nature of the present disclosed invention, coupled with the expected cost reductions through mass production, opens doors to widespread applications, from residential and commercial buildings to handheld consumer devices. They are a clean, efficient way to harness the power of the sun and provide much needed energy conservation for our environment.

The present disclosure aims to harness ambient light more efficiently than traditional solar technologies, expanding the range of usable light sources for energy recycling. Integrating communication units and user control mechanisms, the present disclosure seeks to empower users with real-time monitoring and control over energy management, enhancing system adaptability and user experience. The present disclosure's modular and scalable design suggests an objective to create a versatile energy recycling platform adaptable to various applications and environments. The incorporation of transparent or semi-transparent materials indicates an objective to integrate energy recycling functionalities into architectural elements without compromising aesthetics. Through efficient energy recycling and storage, the present disclosure likely aims to promote sustainable energy practices, contributing to environmental conservation efforts.

The present disclosure details specific components like emitting substrates, photochromatic materials, integrated energy storage devices, and regulation circuits. This specificity provides a tangible and structured system rather than a mere abstract idea. The invention combines various elements (emitting, converting, storing, regulating, and distributing) into a cohesive system designed for a specific purpose (energy recycling and management). This integrated functionality offers practical utility beyond abstract concepts. The present disclosure's focus on energy recycling, storage and distribution and management addresses tangible challenges in the energy sector, emphasizing its practical application over mere theoretical or abstract concepts. While individual components like photochromatic materials or energy storage devices exist in isolation in prior art, the claimed limitations introduces a novel integration of these components to achieve enhanced energy recycling efficiency and conservation and user control.

Further, a unique approach using transparent luminescent solar concentrators, which may not be obvious to someone skilled in conventional solar technologies, especially in terms of capturing specific non-visible light wavelengths. The inclusion of a communication unit and user control mechanisms offers a more sophisticated and user-centric approach to energy recycling systems, potentially diverging from conventional designs known to those skilled in the art. The ability to interconnect multiple energy devices and manage their combined output and storage in an integrated manner represents a unique solution to address scalability challenges, potentially offering advantages over traditional modular systems.

Figure 2:
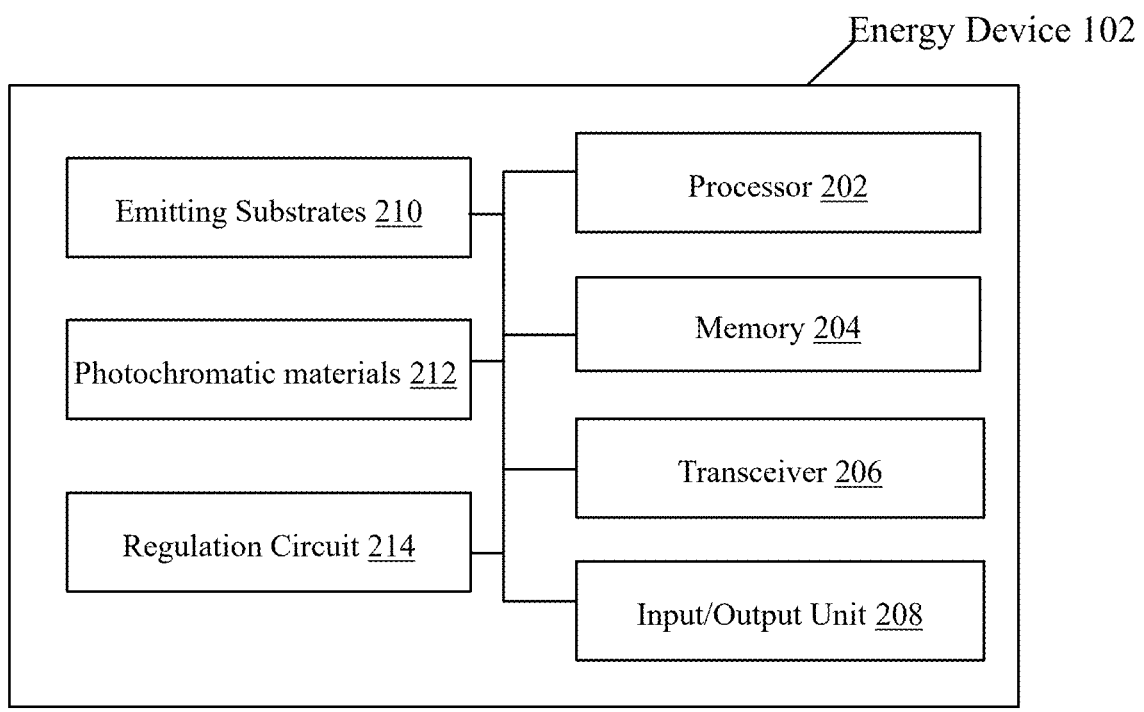
FIG. 2 is a block diagram that illustrates an energy device configured for harvesting solar energy, in accordance with an embodiment of the present disclosure.

FIG. 2 is a block diagram that illustrates an energy device 102 configured for recycling solar energy, in accordance with an embodiment of the present disclosure. FIG. 2 is explained in conjunction with elements from FIG. 1. Here, the energy device 102 preferably includes a processor 202, a memory 204, a transceiver 206, an input/output unit 208, an emitting substrate 210, a photochromatic materials 212, and regulation circuit 214. The processor 202 is further preferably communicatively coupled to the memory 204, the transceiver 206, the input/output unit 208, the emitting substrates 210, the photochromatic materials 212 and regulation circuit 214, while the transceiver 206 is preferably communicatively coupled to the communication unit 106. Processor 202 comprises suitable logic, circuitry, interfaces, and/or code that may be configured to execute a set of instructions stored in the memory 204, and may be implemented based on several processor technologies known in the art. The processor 202 works in coordination with the transceiver 206, the input/output unit 208, the emitting substrate 210, the photochromatic materials 212 and the regulation circuit 214. The processor monitors and regulates the voltage and current generated by the photochromatic materials (acting as PV solar cells). This ensures that the electrical energy produced is at the appropriate levels for storage and distribution.

By continuously adjusting voltage and current parameters, the processor maximizes the efficiency of energy conversion, storage, and utilization, minimizing energy losses in the system. The processor determines the energy demand from connected electrical grids or loads (218) and ensures that the appropriate amount of stored or real-time generated energy is supplied, maintaining a stable and reliable power supply. Incorporating safety features, the processor can detect and respond to potential overloads, short circuits, or other anomalies, protecting the system components and ensuring safe operation. The processor interfaces with the communication unit, facilitating data transmission to external devices. This enables real-time monitoring of system performance and user control over energy distribution and storage parameters. The processor may employ adaptive control algorithms or feedback mechanisms using artificial intelligence, adjusting system parameters based on changing environmental conditions, energy demand patterns, or user-defined settings, ensuring optimal system performance under varying circumstances.

Memory 204 comprises suitable logic, circuitry, interfaces, and/or code that may be configured to store these to instructions, which are executed by the processor 202. Preferably, memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), an optical drive, a storage server either local or cloud based, and/or a Secure Digital (SD) card or Flash Drive. The memory would store historical data related to energy production, storage levels, system performance metrics, and user-defined settings. This stored data enables performance analysis, trend monitoring, and system optimization. Critical system parameters, user preferences, energy distribution schedules, and communication protocols can be stored in memory. This ensures consistent operation and facilitates user customization of system behavior. The memory could record significant events, alarms, or system anomalies. This logging capability aids in troubleshooting, maintenance, and system diagnostics, ensuring timely identification and resolution of potential issues. In systems with programmable components, the memory might store firmware updates or configuration files. This supports system adaptability, feature enhancements, and ensures compatibility with evolving technological standards. User interactions, control inputs, and system adjustments could be logged in memory. This provides a record of user engagement, preferences, and system usage patterns, supporting personalized user experiences and system adaptability. Secure storage of authentication credentials, encryption keys, or access control parameters may be implemented in memory, ensuring data integrity, system security, and user privacy Transceiver 206 comprises a Communication Unit (106) configured to transmit information related to the power output of the system and the storage capacity of the integrated energy storage device (104). The external device (108) could be a cloud server (108a), or an application installed on an electronic device (108b) belonging to the user. The Communication Unit (106) utilizes both wired and wireless technologies to transmit information. Wireless technologies include Bluetooth, ZigBee, satellite, Wi-Fi, or NFC. Wired technologies include LAN, WAN, or MAN. The user can regulate, and control various aspects of the smart energy recycling system based on the transmitted information. This control includes managing the power output of the system, adjusting the storage capacity of the integrated energy storage device, and determining the timing of electrical energy usage. Multiple energy devices can be electrically connected to each other in series, either wirelessly or in a wired manner. The combined power output of these interconnected energy devices is stored in the integrated energy storage device (104) or provided to electrical grids or loads (218).

This ensures flexible connectivity options and interoperability with diverse communication infrastructures. Monitoring and optimizing signal strength, quality, and reliability are essential functions of the transceiver. It ensures stable communication channels, minimizes data transmission errors, and adapts to changing environmental conditions or interference. Implementing security measures such as data encryption, authentication, and secure data transmission protocols, the transceiver safeguards sensitive information, maintains data integrity, and protects against unauthorized access or cyber threats. In scenarios involving multiple Smart Energy Recycling Systems or networked devices, the transceiver facilitates seamless integration, coordination, and communication within the network, supporting synchronized operation and collaborative functionalities. The input output unit 208 comprises a mechanism for receiving requests for energy recycling from users via electronic devices. Users can initiate energy recycling by making requests through their electronic devices serving as a form of input to the system. The communication unit is a part of the output unit as it is responsible for transmitting information related to the power output and storage capacity of the smart energy recycling system to external devices. The user can regulate, and control aspects of the system based on this information, indicating an output of processed information to users for decision-making.

Emitting substrate 210 is designed to emit light when powered, generating photons that initiate the energy conversion process within the system. Depending on the application and requirements, the emitted light may vary in intensity, wavelength, or duration. The emitting substrate can encompass various light-emitting technologies such as LEDs (Light Emitting Diodes), filaments, or lasers. Each technology offers distinct advantages in terms of efficiency, brightness, spectral characteristics, and operational lifespan, allowing flexibility in system design and performance optimization. The emitting substrate's energy input can be regulated, modulated, or controlled to adjust the emitted light's properties, intensity levels, or operational patterns. This control capability facilitates precise energy management, adaptive performance, and optimized energy conversion efficiency. Positioned within the system's architecture, the emitting substrate interacts with surrounding photochromatic materials (acting as photovoltaic solar cells), providing the necessary light energy for conversion into electrical energy. The spatial arrangement, alignment, and proximity between the emitting substrate and photochromatic materials are optimized to maximize energy transfer and conversion efficiency. The emitting substrate's design may incorporate features to withstand environmental factors such as temperature variations, humidity, or mechanical stresses, ensuring reliable operation and longevity in diverse application environments. Engineered for high energy efficiency, the emitting substrate minimizes energy wastage, heat generation, or operational losses, contributing to sustainable energy recycling practices, energy conservation, and enhanced system performance. The emitting substrate complies with relevant safety standards, emission regulations, or performance criteria, ensuring user safety, environmental sustainability, and regulatory compliance within the Smart Energy Recycling System.

The photochromatic materials 212 are specifically engineered to absorb photons emitted by the emitting substrate and convert them into electrical energy. This conversion process utilizes the photoelectric effect. In an embodiment absorbed photons excite electrons, generating an electrical potential difference. Functioning akin to photovoltaic (PV) solar cells, the photochromatic materials may comprise semiconductor-based structures with specific energy band gaps optimized for photon absorption and electron excitation. These materials exhibit photovoltaic properties, producing electrical current proportional to the absorbed light intensity. Designed for high conversion efficiency, the photochromatic materials exhibit optimal spectral responsiveness to the emitted light's wavelength and intensity. Their spectral characteristics ensure effective photon absorption, minimizing energy losses and maximizing electrical output. Strategically positioned around or adjacent to the emitting substrate, the photochromatic materials form a synergistic interface facilitating efficient light absorption and energy conversion. Their spatial arrangement and proximity to the emitting substrate are optimized to enhance energy transfer efficiency and system performance. The photochromatic materials' composition, structure, and properties may encompass semiconductor compounds, organic-inorganic hybrids, or specialized nanostructures tailored for enhanced light absorption, charge separation, and electrical conductivity. These materials undergo rigorous characterization and optimization processes to ensure compatibility, durability, and performance reliability within the Smart Energy Recycling System. Engineered for robustness and longevity, the photochromatic materials may exhibit resistance to environmental factors, operational stresses, or performance degradation mechanisms such as photodegradation. Their stability ensures sustained energy conversion efficiency and system reliability over extended operational durations. The photochromatic materials' design and synthesis processes support scalability, adaptability, and customization to accommodate diverse system configurations, application requirements, or technological advancements, fostering innovation and optimization within the Smart Energy Recycling System.

The regulation circuit 214 actively monitors, adjusts, and maintains the voltage and current levels generated by the photochromatic materials (acting as photovoltaic solar cells). By optimizing these parameters, the circuit ensures compatibility with the integrated energy storage device and downstream electrical systems, maximizing energy utilization and system performance. Through precise regulation of electrical parameters, the regulation circuit enhances energy conversion efficiency, minimizing losses, inefficiencies, or mismatched impedances that could compromise energy recycling capabilities or system reliability. The regulation circuit manages the charging process of the integrated energy storage device, controlling the charging current, voltage levels, and charge-discharge cycles. This ensures optimal energy storage, prolongs battery lifespan, and facilitates adaptive energy management strategies tailored to varying energy demands or environmental conditions. Incorporating protective features such as overvoltage protection, overcurrent protection, or thermal management mechanisms, the regulation circuit safeguards system components, mitigates risks of electrical faults, and ensures safe, reliable operation under diverse operational scenarios or external disturbances. Leveraging feedback control mechanisms, adaptive algorithms, or intelligent control strategies, the regulation circuit dynamically adjusts system parameters in response to changing conditions, user-defined preferences, or real-time performance metrics, optimizing energy recycling, storage, and distribution processes. The regulation circuit interfaces seamlessly with communication units, processors, and user control interfaces, supporting coordinated system operation, synchronized data exchange, and integrated control functionalities. This collaborative integration enhances system responsiveness, adaptability, and user-centric functionality within the Smart Energy Recycling System. Serving as a central hub for energy management, the regulation controller circuit orchestrates the distribution of harvested energy to electrical grids, connected loads, or external devices, ensuring balanced energy allocation, efficient utilization, and adaptive power delivery tailored to specific application requirements or user preferences.

In an exemplary operation, the smart energy recycling system comprises an energy device. The energy device comprises a plurality of emitting substrates configured to emit light of a pre-defined wavelength after receiving power from a power grid. In an embodiment, the plurality of emitting substrates comprises at least one of LED's, filaments, Incandescent Bulbs, Fluorescent Lamps, Compact Fluorescent Lamps, High-Intensity Discharge Lamps, Neon Lights, Electroluminescent Panels, Organic Light-Emitting Diodes, and lasers. A plurality of emitting substrates of an energy device is configured to emit light of a pre-defined wavelength after receiving power from a power grid. A plurality of photochromatic materials is disposed around the plurality of emitting substrates. In an embodiment, the plurality of photochromatic material is configured to convert photons emitted by the plurality of emitting substrates into electrical energy. In an embodiment, the plurality of photochromatic materials corresponds to PV solar cells. In an embodiment, the plurality of photochromatic materials being either opaque, semi-transparent or fully transparent.

The plurality of emitting substrates of the energy device is configured to convert photons emitted by the plurality of emitting substrates into an electrical energy. In an embodiment, the plurality of photochromatic materials corresponds to PV solar cells. In an embodiment, a plurality of photochromatic materials disposed around the plurality of emitting substrates. Further, transparent luminescent solar concentrator (TLSC) is configured to absorb a specific invisible ultraviolet (UV) and an infrared light wavelength. In an embodiment, the TLSC comprises one or more organic salts configured to enable absorption and the absorbed wavelengths cause the organic salts to luminesce. The TLSC is configured to emit light in invisible wavelength. In an embodiment, the light in the invisible wavelength is within an infrared range.

The TLSC is configured to guide the emitted light in invisible wavelength to one or more edges of one or more structures. In an embodiment, the one or more structures corresponds to at least one of a window or a panel or a lighting device. The TLSC is configured to convert the guided emitted light to electrical energy using one or more thin photovoltaic (PV) solar cell strips positioned at the one or more edges thereby performing energy recycling. The integrated energy storage device is electrically connected to the energy device and configured to store the electrical energy produced by the plurality of photochromatic materials. The integrated energy storage device is configured to store the electrical energy produced by the plurality of photochromatic materials into an integrated energy storage device comprises at least one of Lithium-ion battery pack or Sodium-Ion Battery or Lead-Acid Battery or Ultracapacitor or Solid-State Battery or Zinc-Bromine Flow Battery or Organic Redox Flow Battery or uses molten salt as an electrolyte or offers high-temperature stability or Aluminum-Ion Battery, or Flywheel Energy Storage. In an embodiment, the energy device is electrically connected to the integrated energy storage device. The regulation circuit of the integrated energy storage device is configured to regulate and direct a voltage and a current generated by the plurality of photochromatic materials. The regulation control circuit is further configured to regulate and direct a voltage and a current generated by the plurality of photochromatic materials to provide the electrical energy to at least one of an electrical grid or one or more loads.

The energy device is further configured to provide the electrical energy to at least one of an electrical grid or one or more loads. In an embodiment, the electrical energy being stored in the integrated energy storage device. The communication unit configured to transmit information related to the power output of the smart energy recycling system and a storage capacity of the integrated energy storage device to an external device. In an embodiment, the external device corresponds to at least one of a cloud server, an application installed on an electronic device of a user. The communication unit utilizes wired and wireless technologies to transmit information. The wireless technologies comprise at least one of Bluetooth, ZigBee, Wi-Fi, satellite, or NFC. In an embodiment, the wired technologies comprise at least one of LAN, WAN, or MAN.

In an embodiment, the user regulates and controls at least one of the power outputs of the smart energy recycling system, the storage capacity of the integrated energy storage device, and a timing of usage of the generated electrical energy from the electronic device based on the transmitted information. For such regulation, the energy device may be configured to receive a request for energy recycling from a user via an electronic device. In an embodiment, the request comprises utilizing at least one of a stored electrical energy in the integrated energy storage device or generating the electrical energy from the energy device. In response to such a request, the energy device may be configured to utilize the harvested energy for powering one or more loads based on the received request.

In an embodiment, the plurality of the energy devices may be electrically connected to each other in series either in wireless manner or in a wired manner. In an embodiment, a combined power output of the plurality of the energy devices is stored in the integrated energy storage device or provided to at least one of an electrical grid or one or more loads.

In summary, the presented invention introduces the Smart Energy Recycling System designed to efficiently capture, store, conserve and manage electrical energy from ambient light sources. Central to the system is an energy device comprising emitting substrates and surrounding photochromatic materials. These materials convert emitted photons into electrical energy, leveraging a broad range of light sources for enhanced efficiency. Emitting Substrates which can be LEDs, filaments, or lasers, emit light upon receiving power, serving as the primary source of photons for energy conversion. The Photochromatic Materials are strategically positioned around the emitting substrates, these materials act as photovoltaic (PV) solar cells, converting emitted photons into electrical energy. Their design can be opaque, semi-transparent, or transparent, allowing for versatile integration into various applications.

The Integrated Energy Storage Devices stores the harvested electrical energy, ensuring optimal utilization and distribution based on system requirements and user preferences. The Regulation control Circuit which is integral to the integrated energy storage device in one embodiment, manages voltage and current levels, ensuring efficient energy conversion and distribution to electrical grids or loads. The Communication Unit facilitates real-time monitoring and control. This unit transmits system performance data, including power output and storage capacity, to external devices such as cloud servers or user applications. This feature empowers users with comprehensive control over system parameters and energy usage scheduling.

The system's modular design allows for seamless integration of multiple energy devices, either wirelessly or wired, enabling scalable deployments tailored to specific energy demands and environments. The Transparent Luminescent Solar Concentrator captures specific non-visible light wavelengths. This expands the system's adaptability to diverse lighting conditions, enhancing overall energy recycling potential. Designed with architectural flexibility in mind, the system's components, particularly the transparent or semi-transparent materials, facilitate aesthetic integration into structures like windows, lighting devices, or panels without compromising energy efficiency.

In essence, the Smart Energy Recycling System represents a comprehensive and unique solution in the realm of energy recycling technologies. By synergizing advanced materials, integrated circuitry, user-centric controls, and scalable design principles, the invention offers a cross platform for sustainable and efficient energy management in various applications.

Figure 3:
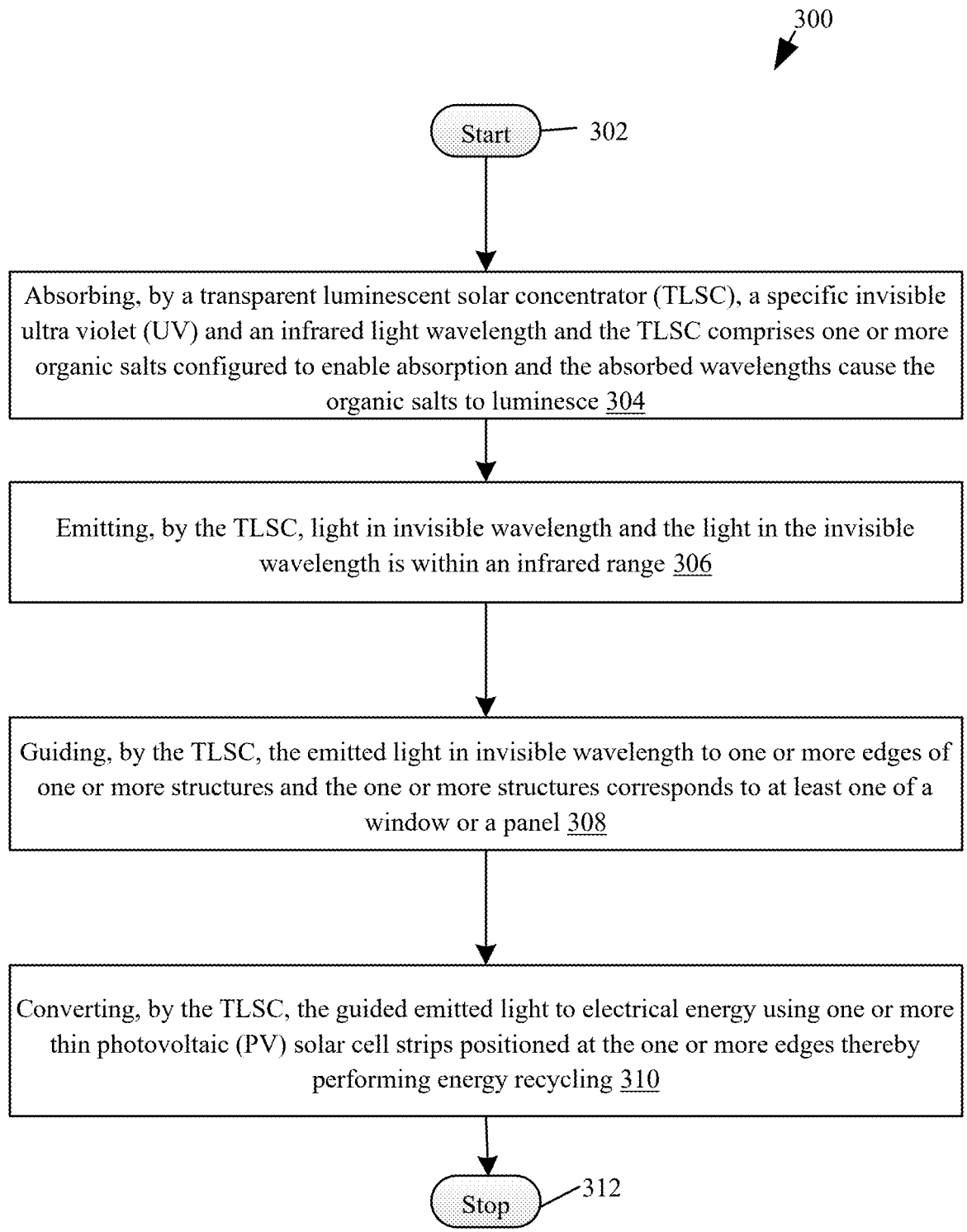
FIG. 3 is a flowchart that illustrates a method for harvesting solar energy, in accordance with an embodiment of the present disclosure.

FIG. 3 is a flowchart that illustrates method 300 for recycling solar energy, in accordance with an embodiment of the present disclosure. The method begins at Start step 302 and proceeds to step 304.

At step 304, the energy device is configured to absorb, by a transparent luminescent solar concentrator (TLSC), a specific invisible ultraviolet (UV) and an infrared light wavelength and the TLSC comprises one or more organic salts configured to enable absorption and the absorbed wave lengths cause the organic salts to luminesce. At step 306, the energy device is configured to emit, by the TLSC, light in invisible wavelength and the light in the invisible wavelength is within an infrared range.

At step 308, the energy device is configured to guide, by the TLSC, the emitted light in invisible wavelength to one or more edges of one or more structures and the one or more structures corresponds to at least one of a window or a panel. At step 310, the energy device is configured to convert, by the TLSC, the guided emitted light to electrical energy using one or more thin photovoltaic (PV) solar cell strips positioned at the one or more edges thereby performing energy recycling. Control passes to stop step 312.

Figure 4:
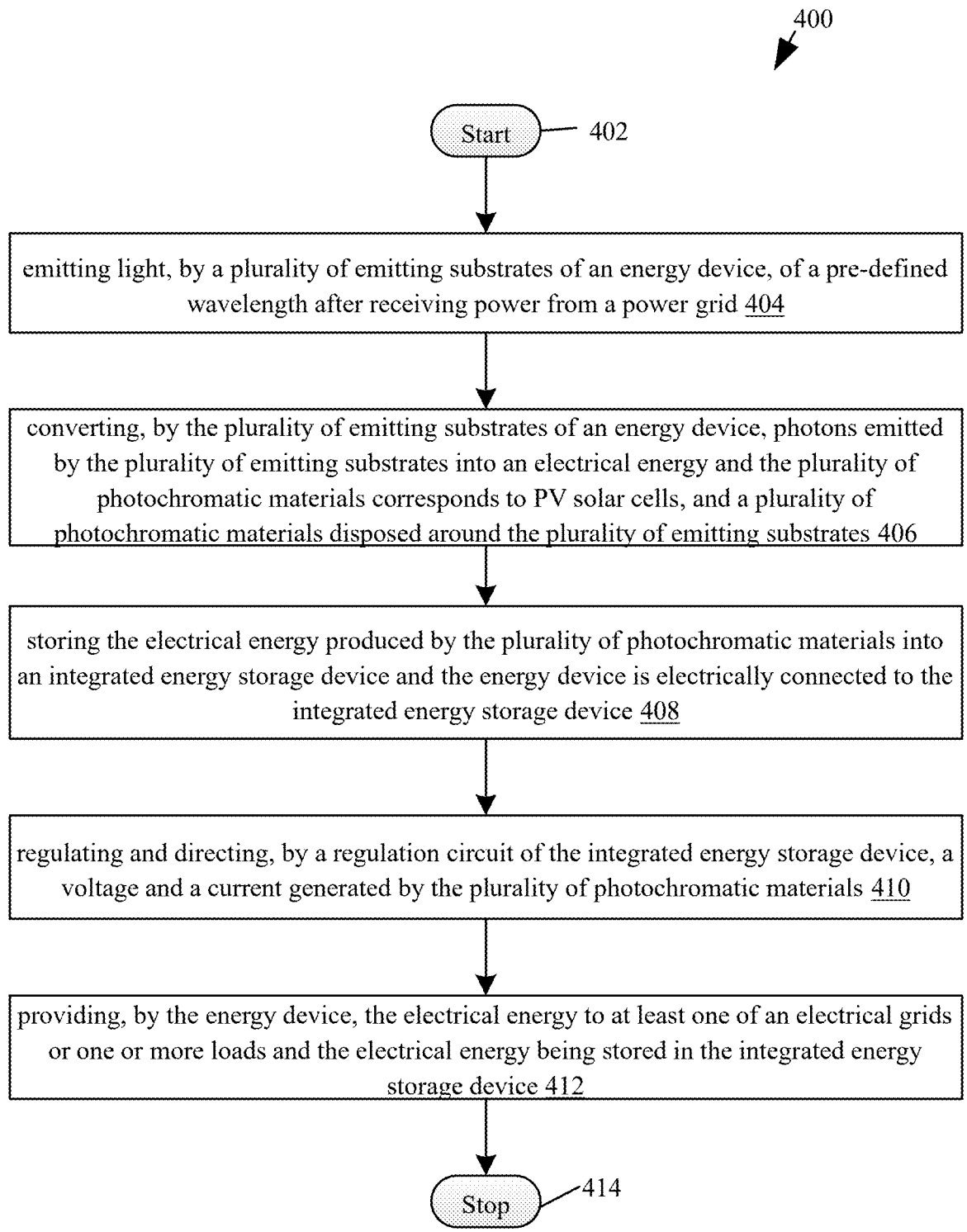
FIG. 4 is a flowchart that illustrates a method for storing solar energy, in accordance with an embodiment of the present disclosure.

FIG. 4 is a flowchart that illustrates method 400 for storing solar energy, in accordance with an embodiment of the present disclosure. The method begins in at Start step 402 and proceeds to step 404.

At step 404, the energy device is configured to emit light, by a plurality of emitting substrates of an energy device, of a pre-defined wavelength after receiving power from a power grid. At step 406, the energy device is configured to convert, by the plurality of emitting substrates of an energy device, photons emitted by the plurality of emitting substrates into an electrical energy and the plurality of photochromatic materials corresponds to PV solar cells, and a plurality of photochromatic materials disposed around the plurality of emitting substrates. At step 408, the energy device is configured to store the electrical energy produced by the plurality of photochromatic materials into an integrated energy storage device and the energy device is electrically connected to the integrated energy storage device. At step 410, the energy device is configured to regulate and direct, by a regulation control circuit of the integrated energy storage device, a voltage and a current generated by the plurality of photochromatic materials. At step 412, the energy device is configured to provide, by the energy device, the electrical energy to at least one of an electrical grid or one or more loads and the electrical energy being stored in the integrated energy storage device. Control passes to stop step 414.

In a working but non-limiting example of the aforementioned disclosure, following is a detailed working example illustrating the functionality and operation of the claimed Smart Energy Recycling System. Below is the list of the major components of the system.

Energy Device: Solar panels integrated with photovoltaic materials and energy storage.

Integrated Energy Storage Device: Lithium-ion battery pack or Sodium-Ion Battery or Lead-Acid Battery or Ultra capacitor or Solid-State Battery or Zinc-Bromine Flow Battery or Organic Redox Flow Battery or Uses molten salt as an electrolyte or Offers high-temperature stability or Aluminum-Ion Battery: or Flywheel Energy Storage.

Communication Unit (106): Wi-Fi-enabled microcontroller.

Electronic Device (108*b*): Smartphone or tablet or laptop with a dedicated energy management application.

Cloud Server: Remote server hosting a cloud-based energy management platform.

Let us consider a working example of a Smart Energy Recycling System that incorporates transparent photovoltaics in a transparent window to power a smart lighting system. Smart Energy Recycling System with Transparent Photovoltaic Windows Components:

Transparent Photovoltaic Windows: Installed on the exterior of a building, these windows are embedded with transparent luminescent solar concentrators (TLSC) that capture specific invisible ultraviolet (UV) and infrared light wavelengths.

Integrated Energy Storage Device: A compact, high-capacity battery system located within the building to store the electrical energy generated by the transparent photovoltaic windows.

LED Lighting System: A smart LED lighting system installed within the building, designed to provide efficient and customizable illumination for various spaces.

Communication Unit (106): A microcontroller with wireless connectivity (e.g., Wi-Fi) that manages the energy distribution and communicates with external devices.

Electronic Device (108*b*): A smartphone with a dedicated application for monitoring and controlling the smart lighting system.

The TLSC embedded in the transparent photovoltaic windows absorbs specific UV and infrared light, converting it into electrical energy. The generated electrical energy is fed into the integrated energy storage device for later use. The microcontroller monitors the energy levels in the integrated energy storage device and regulates the voltage and current for efficient energy utilization. Users can control the smart LED lighting system using the smartphone application. The application allows users to adjust the brightness, color temperature, and schedule automated lighting scenarios based on their preferences.

The microcontroller uses data from the transparent photovoltaic windows, energy storage device, and user preferences to optimize the energy distribution for lighting needs. Machine learning algorithms may be employed to adaptively adjust lighting patterns based on historical data, environmental conditions, and user behavior. The microcontroller communicates with the smartphone application, providing real-time updates on energy levels, lighting system status, and energy consumption. Users can remotely monitor and control the smart lighting system, ensuring energy-efficient operation even when away from the building.

The microcontroller can communicate with other smart home devices or external platforms through wireless technologies, enabling integration with home automation systems or energy management platforms. Secure communication protocols are implemented between the microcontroller and the smartphone application to ensure data privacy, user authentication, and protection against unauthorized access.

The transparent photovoltaic windows harness ambient light, providing a renewable and sustainable energy source for the building's lighting needs. Users can customize and control the smart lighting system through a user-friendly smartphone application, enhancing user experience and convenience. The system adapts to changing lighting requirements and environmental conditions, optimizing energy use, and reducing electricity costs. The transparent photovoltaic windows maintain a visually appealing and transparent appearance while contributing to energy recycling. In summary, this working example demonstrates a Smart Energy Recycling System that integrates transparent photovoltaic windows with a smart LED lighting system, showcasing the potential for sustainable and adaptive energy management in buildings.

Figure 5:
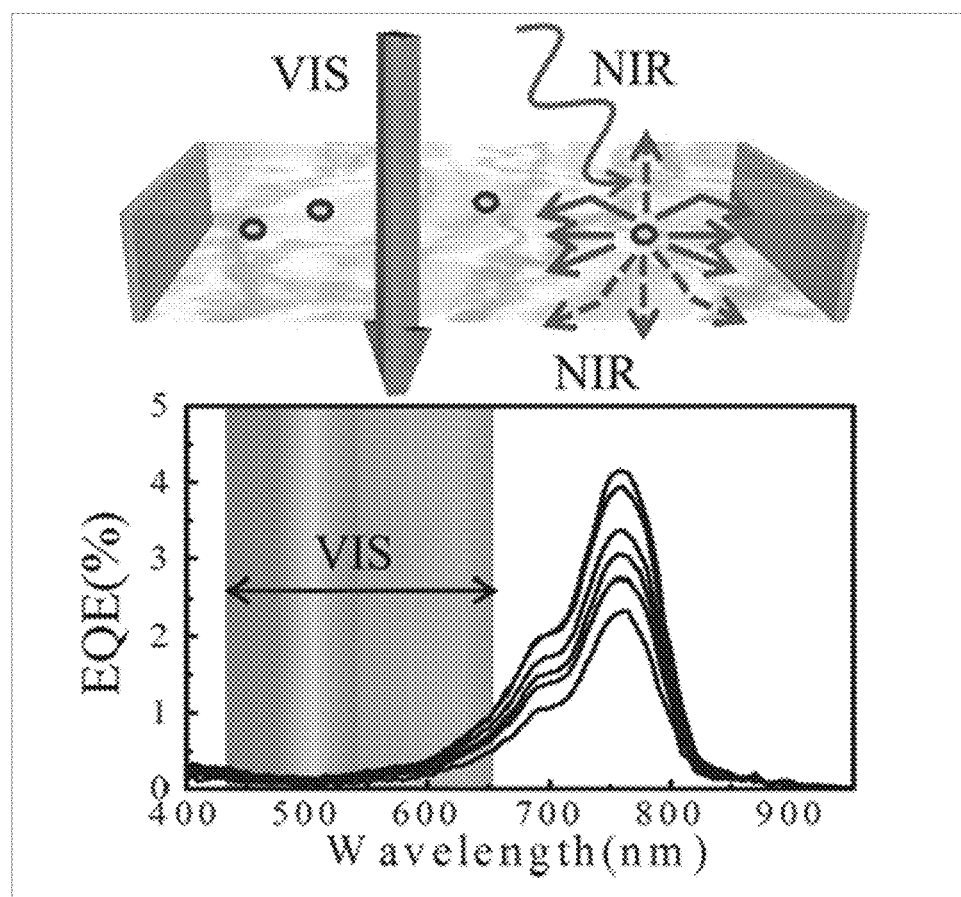
FIG. 5 illustrates a graph that explains how organic salts absorb UV and infrared and emit infrared and shows the processes that occur outside of the visible spectrum, so that the PV cells appears transparent, in accordance with an embodiment of the present disclosure.

FIG. 5 illustrates a graph that explains how organic salts absorb UV and infrared and emit infrared and shows the processes that occur outside of the visible spectrum, so that the PV cells appears transparent, in accordance with an embodiment of the present disclosure.

The TLSC is composed of organic salts that are designed to absorb specific invisible UV and infrared light wavelengths, which then glow (luminesce) as another invisible wavelength. This new wavelength is then guided to the edge of the window plastic, which thin PV solar cell strips convert it into electricity. As mentioned in an article on Solar magazine with title "Transparent Solar Panels: Reforming Future Energy Supply," once the mass production begins for transparent solar panels, researchers estimate that the TLSC should be able to deliver an efficiency of about 10%. This may not appear to be an earth-shattering number, but on a national or global scale, when almost every window in a home or office building consists of clear solar panels, the results can be transformative. As the transparent solar panels cost comes down with their mass production and deployment, this non-intrusive technology can be scaled right from commercial and industries.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Figure 6:
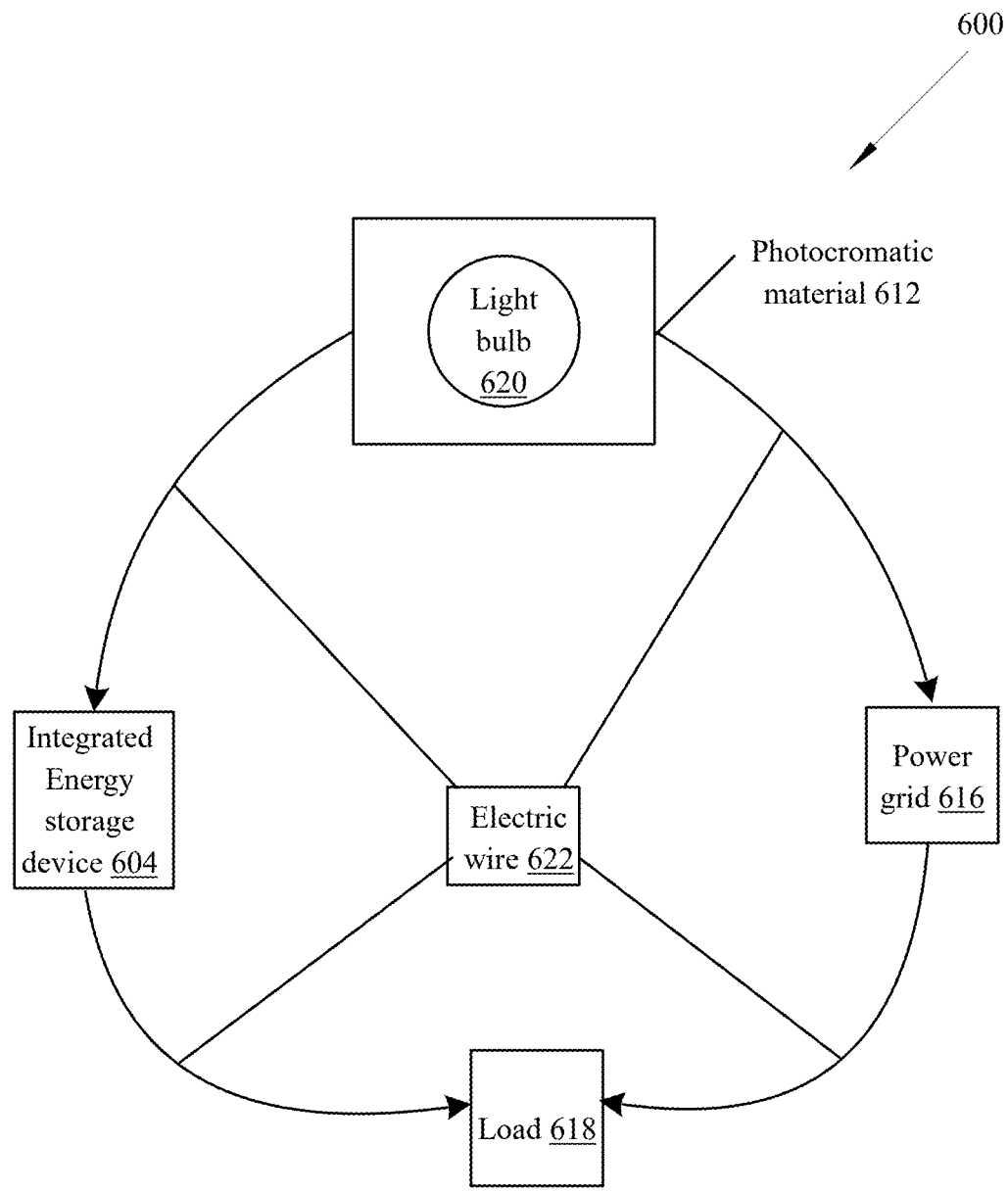
FIG. 6 shows a sample diagram that illustrates a working of a lighting device, in accordance with an embodiment of the present disclosure.

FIG. 6 circuit diagram that illustrates a working of a lighting device, in accordance with an embodiment of the present disclosure. Lightning device comprises Light Bulb (620) that comes in various types, including incandescent, fluorescent, LED with its own characteristics in terms of energy efficiency, lifespan, and light quality. Photochromic Materials (612) are substances that undergo a reversible change in color or optical properties in response to exposure to light. They can change from one color to another or become transparent when exposed to ultraviolet (UV) light. Photochromic materials (612) are commonly used in eyeglasses, windows, and lenses. For example, photochromic eyeglass lenses darken in response to sunlight, providing UV protection.

Photochromatic Material (612) In the context of the smart energy recycling system, it is more likely that the term "photochromic material" is intended that such materials are positioned around the emitting substrates such as LEDs, filaments, or lasers in the energy device (102). Photochromic materials (612) are configured to convert photons emitted by the emitting substrates into electrical energy. This conversion process is a key aspect of the energy recycling system, where light energy is transformed into electrical energy.

The integrated energy storage device (604) is electrically connected to the energy device (102). Its primary function is to store the electrical energy produced by the plurality of photochromic materials (612) when they convert photons emitted by the emitting substrates (210) into electrical energy. After the photochromic materials have converted light into electrical energy, the integrated energy storage device serves as a reservoir or storage medium to hold that energy. This stored electrical energy can later be regulated, directed, and provided to either electrical grids (616) or loads (618) based on the control of the regulation circuit (214) and user preferences.

Integrated Energy storage device (604) is crucial in systems like this because it allows for the capture of energy during periods of light emission and enables the use of that stored energy during times when the light emission may not be occurring, ensuring a more continuous and reliable energy supply.

Load (618)—In electrical engineering, a "load" is any device or component that consumes electrical power from a power source. Loads can include various appliances, electronic devices, lighting systems, or any other equipment that requires electrical energy to operate. An electrical grid may also be considered a type of Load.

The electrical energy stored in the integrated energy storage device (604) is provided to at least one of the electrical grids or one or more loads. The system can receive a request for energy recycling from a user via an electronic device. The user's request includes utilizing at least one of the stored electrical energy in the integrated energy storage device or generating electrical energy from the energy device. The harvested energy is then utilized for powering one or more loads based on the received request. Loads can encompass a wide range of devices, including but not limited to lighting systems, heating and cooling systems, electronic devices, machinery, or any other electrical equipment that requires power to function. Users can regulate and control the power output of the smart energy recycling system, the storage capacity of the integrated energy storage device, and the timing of usage of the generated electrical energy from their electronic devices based on the transmitted information.

Electric wires (622) are often made of copper or aluminum due to their excellent electrical conductivity. Copper is a popular choice for its high conductivity and corrosion resistance. To prevent electrical leakage or short circuits, electric wires are insulated. Insulation materials can include PVC (polyvinyl chloride), rubber, or other materials that provide electrical insulation and mechanical protection. There are several types of electric wires designed for specific applications, Such as, Power cables which are used for transmitting electrical power, Control cables which are used for control circuits in industrial applications, Communication cables which are used for transmitting signals in data and communication systems. Electric wires play a vital role in electrical systems, connecting various components such as outlets, switches, lighting fixtures, and appliances. Proper installation of electric wires is crucial for safety and functionality. Wires are typically routed through conduits or cables, and connections are secured using electrical boxes and connectors.

Figure 7:
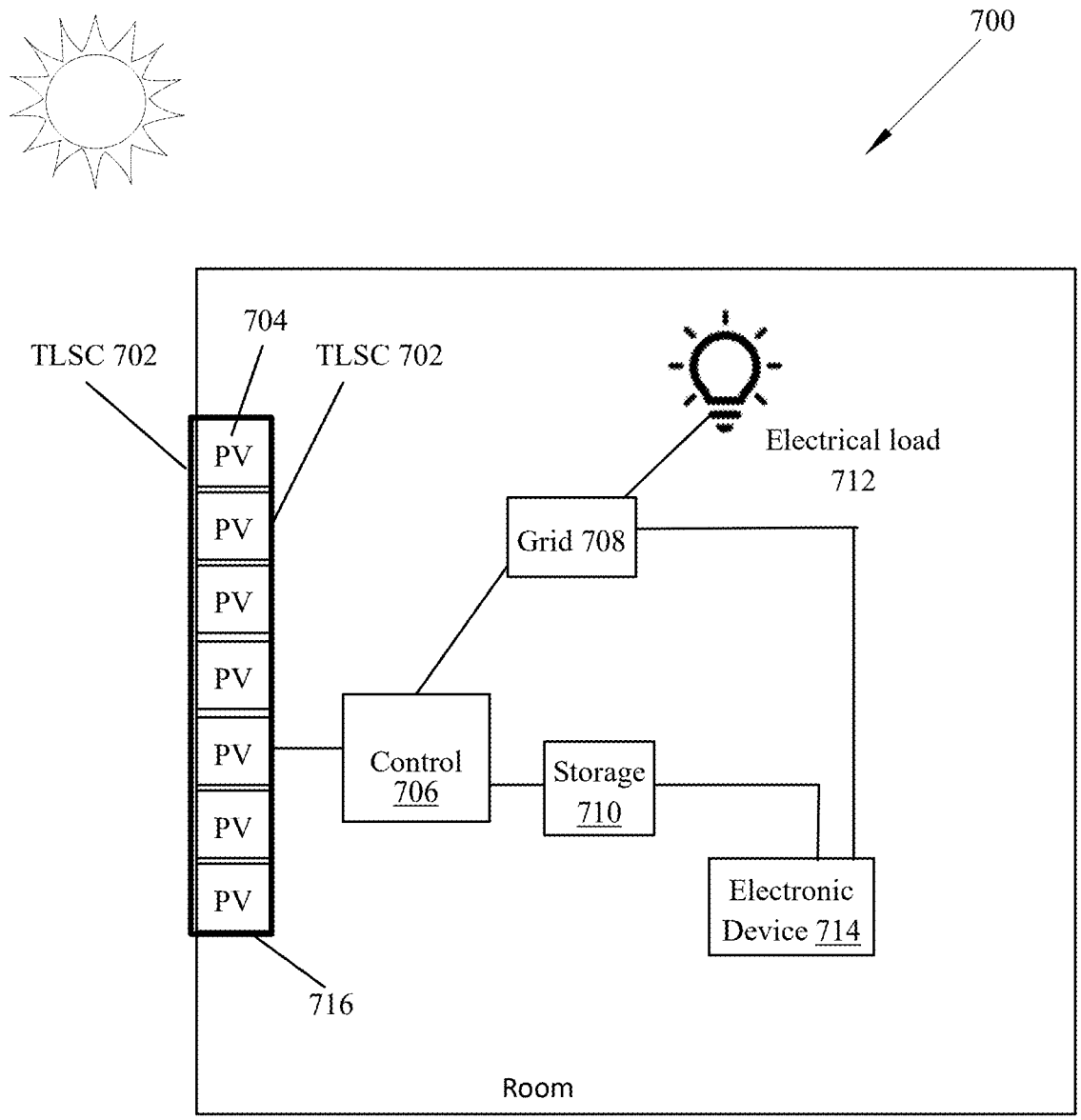
FIG. 7 shows a diagram of a working example of present disclosure in real world, in accordance with an embodiment of the present disclosure.

FIG. 7 shows a diagram of a working example of present disclosure in real world, in accordance with an embodiment of the present disclosure. In FIG. 7 the dual-paned window 716 is covered with the TLSC (Transparent Luminescent Solar Concentrator) (702) layers from both sides. PV solar cells (704) are integrated between the TLSC (702) layers, serving as the "photochromatic materials". TLSC absorbs specific UV and infrared light wavelengths, causing luminescence. This emitted light, primarily in the infrared range, serves as the "light emission primarily intended for illumination". The emitted light is used to "convert photons into electrical energy," via the PV solar cells (704) integrated between the TLSC layers. The electrical energy generated by the PV solar cells (7) is stored in an integrated energy storage device (710). A regulation control circuit (706) regulates the voltage and current of the generated electrical energy. This control circuit also directs the electrical energy to either the grid (708) or the integrated energy storage device (710), based on the system's requirements and conditions. When there is a demand for electrical energy, such as lighting a bulb (712), the stored energy is utilized. Users can control and regulate the system's parameters, including the timing of energy usage and the power output, based on the transmitted information by the electronic device (714). The electrical energy stored in the integrated energy storage device (710) can be provided to electrical loads (712), such as lighting devices (712).

Various embodiments of the disclosure encompass numerous advantages including methods and systems for the smart energy recycling illumination system. The use of photochromatic materials around emitting substrates allows for efficient conversion of emitted photons into electrical energy. This could potentially increase the overall energy capture rate compared to traditional solar technologies, especially in varied lighting conditions. The combination of emitting substrates, photochromatic materials, an integrated energy storage device, and a regulation circuit ensures a streamlined and efficient energy recycling and storage process. This integrated approach minimizes energy losses and optimizes system performance. The inclusion of a communication unit facilitates real-time monitoring of power output and storage capacity. Users can adjust system parameters, control energy distribution, and schedule energy usage, offering enhanced flexibility and customization. The ability to connect multiple energy devices in series, either wirelessly or wired, provides scalability to meet varying energy demands. This modular design ensures adaptability and can be tailored to specific applications or environments.

The transparent luminescent solar concentrator's ability to capture specific non-visible light wavelengths expands the range of usable light sources, potentially increasing energy recycling opportunities, especially in environments with abundant non-visible light. The design considerations, such as the use of transparent or semi-transparent photochromatic materials, allow for aesthetic integration into structures like windows or panels without compromising functionality. This enhances architectural flexibility and promotes broader adoption in various settings. The utilization of both wired and wireless communication technologies ensures reliable data transmission and system control. This robust communication infrastructure supports seamless integration with external devices, cloud servers, or user applications, enhancing system connectivity and accessibility. By harnessing ambient light sources more efficiently and providing user control over energy usage, the invention promotes sustainable energy practices. This aligns with global efforts to reduce carbon footprints and enhance energy efficiency.

These elements are not combined in any prior art method, and the combination of these elements produces a unique and non-obvious invention. In addition, the invention is not obvious because Specific Components and Configurations described in the claims' details about specific components like emitting substrates, photochromatic materials, integrated energy storage devices, and regulation circuits. This specificity provides a tangible and structured system rather than a mere abstract idea. The present disclosure combines various elements (emitting, converting, storing, regulating) into a cohesive system designed for a specific purpose (energy recycling and management). This integrated functionality offers practical utility beyond abstract concepts. The present disclosure focus on energy recycling, storage, energy conservation, and management addresses tangible challenges in the energy sector and provides a utility in real-world applications, emphasizing its practical application over mere theoretical or abstract concepts.

While individual components like photochromatic materials or energy storage devices exist in isolation in prior art, the claimed invention introduces a unique integration of these components to achieve enhanced energy recycling efficiency and user control. The unique approach of using transparent luminescent solar concentrators, which may not be obvious to someone skilled in conventional solar technologies, especially in terms of capturing specific non-visible light wavelengths. The inclusion of a communication unit and user control mechanisms offers a more sophisticated and user-centric approach to energy recycling systems, potentially diverging from conventional designs known to those skilled in the art. The ability to interconnect multiple energy devices and manage their combined output and storage in an integrated manner represents a unique solution to scalability challenges, potentially offering advantages over traditional modular systems. The incorporation of these components integrated to produce an energy conserving lighting system and device is also not obvious to one skilled in the art. Therefore, the invention is not obvious to a person skilled in the art because it combines a number of different elements in a new and non-obvious way, and it solves a technical problem that was not previously solved by prior art methods.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit or multiple integrated circuits that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. A smart energy recycling system, comprising:
    an energy device comprising:
        a plurality of emitting substrates configured to emit light after receiving power from a power grid, wherein the emitted light primarily intended for a purpose of illumination of a specified space;
        a pair of opposed parallel transparent luminescent solar concentrator (TLSC) panes set off from one another within a framework and configured to:
            absorb a portion of the emitted light; and
            guide the absorbed portion of emitted light toward a perimeter of one TLSC of the pair of opposed TLSC panes and at least one edge of the framework;
        the framework further comprising: a structure to support the pair of opposed parallel TLSC panes in their set-off relationship while surrounding the perimeters of the pair of opposed parallel TLSC panes; and
        a plurality of photochromatic materials disposed along an interior perimeter of the framework, thereby defining, with the pair of opposed parallel TLSC panes, an interior region which is devoid of intermediate solid structure wherein the plurality of photochromatic materials is configured to convert photons emitted by the plurality of emitting substrates into electrical energy;
    an integrated energy storage device electrically connected to the energy device and configured to store the electrical energy produced by the plurality of photochromatic materials; and
    a regulation circuit of the integrated energy storage device configured to:
        regulate and direct a voltage and a current generated by the plurality of photochromatic materials; and
        provide the electrical energy to at least one output selected from a set of outputs consisting of: an electrical grid and at least one integrated energy storage device.

2. The smart energy recycling system as claimed in claim 1, wherein the at least one of the plurality of emitting substrates is selected from the set of substrates consisting of: LED's, filaments, and lasers.

3. The smart energy recycling system as claimed in claim 1, further comprises a communication unit configured to transmit information related to a power output of the smart energy recycling system and a storage capacity of the integrated energy storage device to an external device, wherein the external device corresponds to at least one of a cloud server, or an application installed on an electronic device of a user.

4. The smart energy recycling system as claimed in claim 3, wherein the user regulates and controls at least one of the power output of the smart energy recycling system, the storage capacity of the integrated energy storage device, and a timing of usage of the generated electrical energy from the electronic device based on the transmitted information.

5. The smart energy recycling system as claimed in claim 1, wherein the communication unit utilizes wired and wireless technologies to transmit information, wherein the wireless technologies comprise at least one of Bluetooth, ZigBee, satellite, Wi-Fi, or NFC, and wherein the wired technologies comprise at least one of LAN, WAN, or MAN.

6. The smart energy recycling system as claimed in claim 1, further comprises a plurality of the energy devices electrically connected to each other in series, wherein a combined power output of the plurality of the energy devices is stored in the integrated energy storage device and eventually provided to at least one electrical loads.

7. The smart energy recycling system as claimed in claim 1, further comprises a lighting device, wherein the plurality of photochromatic materials disposed around the emitting substrates, are configured to convert emitted photons into electrical energy, wherein the energy storage device is configured to store the electrical energy produced by the photochromatic materials and the energy storage device is configured to regulate and direct a voltage and a current generated by the photochromatic materials, to provide the electrical energy to at least one electrical loads.

8. The smart energy recycling system as claimed in claim 1, wherein the lightening device is configured to plurality of photochromatic materials having a transparency selected from the level of transparencies consisting of: opaque, semi-transparent, or transparent.

9. A method for energy recycling, the method comprising:
emitting light of a pre-defined wavelength by a plurality of emitting substrates of at least one energy device, the at least one energy device receiving power from a power grid;
absorbing, using a transparent luminescent solar concentrator (TLSC), the emitted light;
guiding, using the TLSC, the emitted light to at least one edge of a framework, wherein the framework further comprises a structure that supports the TLSC and a second TLSC such that they form opposed and set-off TLSC panes and surrounds a perimeter of the said TLSC panes;
utilizing at least one photochromatic material to convert photons emitted by the plurality of emitting substrates into an electrical energy, wherein the at least one photochromatic material corresponds to PV solar cells and a plurality of photochromatic materials are disposed along the framework between the opposed and set-off TLSC panes, thereby defining an interior region of the framework with the opposed and set-off TLSC panes, the interior region of the framework being devoid of solid material;
storing the electrical energy produced by the plurality of photochromatic materials into at least one integrated energy storage device, wherein the at least one energy device is electrically connected to the integrated energy storage device;
regulating and directing, by a regulation circuit of the integrated energy storage device, a voltage and a current generated by the plurality of photochromatic materials based on the request;
providing, by the at least one energy device, the electrical energy to at least one electrical grid load, wherein the electrical energy was stored in the integrated energy storage device.

10. The method for energy recycling as claimed in claim 9, wherein at least one of the plurality of emitting substrates is selected form the set of light emitting substrates consisting of: LED's, filaments, and lasers.

11. The method for energy recycling as claimed in claim 9, the method further comprising: transmitting information, by a communication unit, related to a power output of the smart energy recycling system and a storage capacity of the integrated energy storage device to an external device, wherein the external device is at least one external device selected from the set of external devices consisting of: a cloud server, and an application installed on an electronic device of a user.

12. The method for energy recycling as claimed in claim 11, wherein the user regulates and controls at least one of: the power output of the smart energy recycling system, the storage capacity of the integrated energy storage device, and a timing of usage of the generated electrical energy, from the electronic device based on the transmitted information.

13. The method for energy recycling as claimed in claim 9, wherein communication unit utilizes at least one communication technology to transmit information, the communication technology being selected form the set of technologies consisting of: Bluetooth, ZigBee, Wi-Fi, satellite, NFC, LAN, WAN, and MAN.

14. The method for energy recycling as claimed in claim 9, wherein the at least one energy device is a plurality of the energy devices electrically connected to each other in series, wherein a combined power output of the plurality of the energy devices is stored in the integrated energy storage device and provided to at least one electrical loads.

15. The method for energy recycling as claimed in claim 9, further comprising:
receiving a request for energy recycling from a user via an electronic device, wherein the request comprises utilizing at least one of a stored electrical energy in the integrated energy storage device or generate the electrical energy from the energy device; and
utilizing the harvested energy for powering one or more loads based on the received request.

16. The method for energy recycling as claimed in claim 1, wherein the plurality of photochromatic materials are selected form the set of photochromatic materials consisting of: opaque, semi-transparent, and transparent.

17. An energy device comprising:
a plurality of emitting substrates configured to emit light of at least one pre-defined wavelength after receiving power from a power grid, wherein the light primarily intended for a purpose of illumination of a specified space;
a framework supporting two opposed and set-off transparent solar concentrator panes, where each TLSC is configured to:
absorb the emitted light; and
guide the emitted light to at least one edge of the framework;
a plurality of photochromatic materials disposed along an interior perimeter of the framework, between the two opposed and set-off TLSC panes, such that the plurality of photochromatic material is configured to receive and convert photons emitted by the opposed and set-off TLSC panes into electrical energy;

an integrated energy storage device electrically connected to the energy device and configured to store the electrical energy produced by the plurality of photochromatic materials; and a regulation circuit of the integrated energy storage device configured to:

regulate and direct a voltage and a current generated by the plurality of photochromatic materials; and provide the electrical energy to at least one output selected from a set of outputs consisting of: an electrical grid and at least one integrated energy storage devices wherein the two opposed and set-off TLSC panes and the photochromatic materials define an interior region that is devoid of solid material.

18. The smart energy recycling system as claimed in claim 17, comprises a communication unit configured to transmit information related to a power output of the smart energy recycling system and a storage capacity of the integrated energy storage device to an external device, wherein the external device corresponds to at least one of a cloud server, or an application installed on an electronic device of a user.

19. The smart energy recycling system as claimed in claim 18, wherein the user regulates and controls at least one of the power output of the smart energy recycling system, the storage capacity of the integrated energy storage device, and a timing of usage of the generated electrical energy from the electronic device based on the transmitted information.

20. The smart energy recycling system as claimed in claim 17, comprising a plurality of the energy devices electrically connected to each other in series, wherein a combined power output of the plurality of the energy devices is stored in the integrated energy storage device and eventually provided to at least one electrical loads.

* * * * *